(12) United States Patent
Doyle et al.

(10) Patent No.: US 8,752,059 B2
(45) Date of Patent: Jun. 10, 2014

(54) COMPUTER DATA PROCESSING CAPACITY PLANNING USING DEPENDENCY RELATIONSHIPS FROM A CONFIGURATION MANAGEMENT DATABASE

(75) Inventors: Ronald Patrick Doyle, Raleigh, NC (US); David Louis Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1799 days.

(21) Appl. No.: 11/692,137

(22) Filed: Mar. 27, 2007

(65) Prior Publication Data
US 2008/0244611 A1 Oct. 2, 2008

(51) Int. Cl.
*G06F 9/46* (2006.01)
*G06F 15/173* (2006.01)
*G06F 17/30* (2006.01)

(52) U.S. Cl.
USPC ............................ 718/104; 709/224; 707/802

(58) Field of Classification Search
None
See application file for complete search history.

(56) References Cited

U.S. PATENT DOCUMENTS

| | | | |
|---|---|---|---|
| 6,738,736 B1 * | 5/2004 | Bond | 703/2 |
| 7,089,265 B1 * | 8/2006 | Jain et al. | 707/611 |
| 7,483,898 B2 * | 1/2009 | Abdo et al. | 1/1 |
| 7,552,208 B2 * | 6/2009 | Lubrecht et al. | 709/223 |
| 7,949,628 B1 * | 5/2011 | Blazek et al. | 707/600 |
| 2005/0060389 A1 * | 3/2005 | Cherkasova et al. | 709/220 |
| 2006/0064481 A1 * | 3/2006 | Baron et al. | 709/224 |
| 2006/0161879 A1 * | 7/2006 | Lubrecht et al. | 717/101 |
| 2007/0100712 A1 * | 5/2007 | Kilpatrick et al. | 705/29 |
| 2007/0203952 A1 * | 8/2007 | Baron et al. | 707/200 |
| 2007/0288280 A1 * | 12/2007 | Gilbert et al. | 705/8 |
| 2008/0059610 A1 * | 3/2008 | Lin et al. | 709/220 |
| 2009/0228579 A1 * | 9/2009 | Sanghvi et al. | 709/224 |

* cited by examiner

*Primary Examiner* — Abdullah Al Kawsar
(74) *Attorney, Agent, or Firm* — Lee Law, PLLC; Christopher B. Lee

(57) ABSTRACT

The invention discloses a computer data processing capacity planning system that utilizes known workload planning information along with hardware and/or software configuration information from the actual operating environment to accurately estimate the production system capacity available for use in carrying out one or more processing task(s).

18 Claims, 1 Drawing Sheet

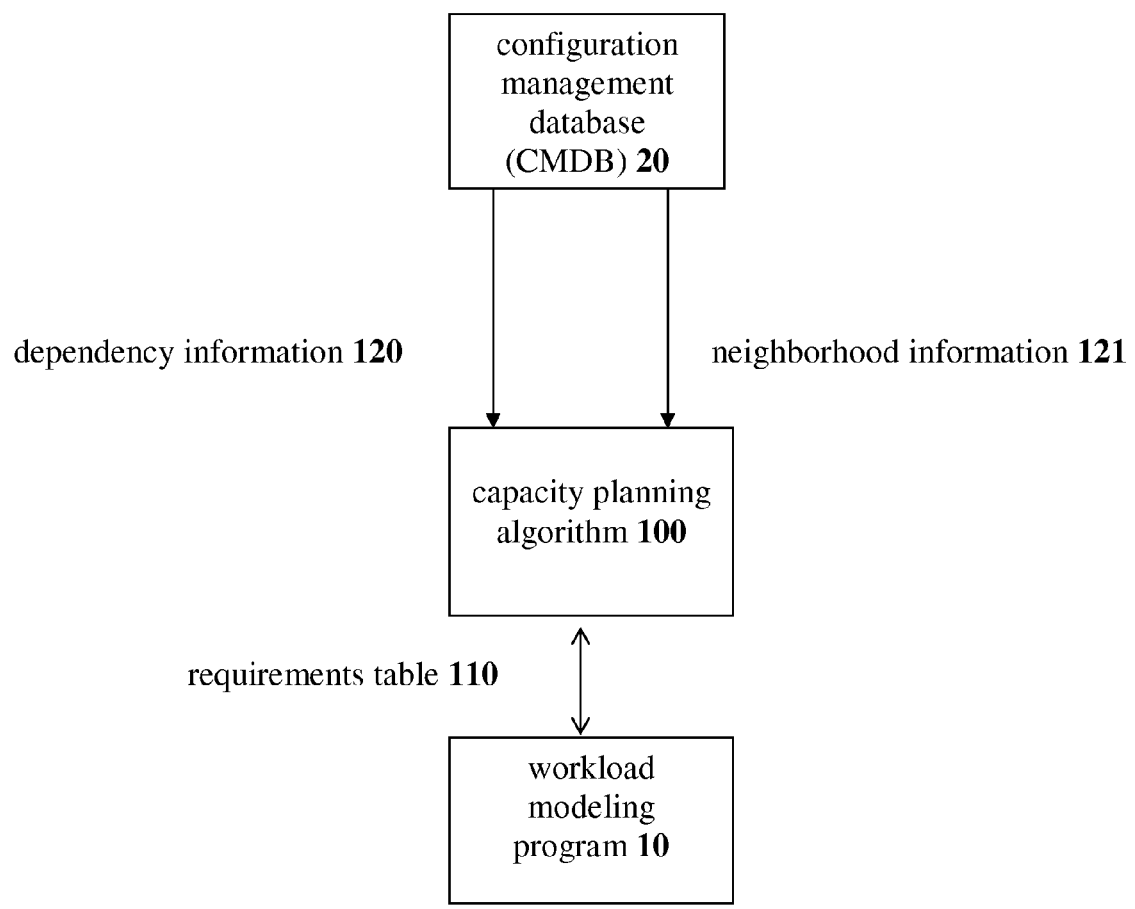

COMPUTER DATA PROCESSING CAPACITY PLANNING USING DEPENDENCY RELATIONSHIPS FROM A CONFIGURATION MANAGEMENT DATABASE

TECHNICAL FIELD

This invention relates to computer system data processing capacity planning utilizing information stored in a configuration management database (CMDB).

BACKGROUND

A configuration management database (CMDB) provides a mechanism for specifying and storing system configuration "artifacts" (i.e., computer hardware and/or software processing resources) and "dependencies" (i.e., the data and/or parameters used in defining the relationships) among those artifacts for accomplishing a given set of processing task(s). The "artifacts" include a specification of the hardware and software components (identifying computer processors, memory, peripherals, clients/servers, routers, application and/or operating system software, databases and transaction tiers, etc.) which make up the necessary system processing infrastructure, while "dependency" information includes configuration data defining the physical and/or functional and/or informational relationships between these processing resources used for meeting business or other production goals (for example, this information can be populated in a CMDB using program tools such as Collation Confignia).

Known techniques for system capacity planning involve estimating the expected workload (in terms of extent and rate of data input and/or output) while also accounting for any limitations and resource requirements of the software (and of the physical processing and/or memory components) used for a given application in order to determine the necessary resources to allocate in meeting production requirements, such as planning the server capacity needed to accommodate the peak and normal loads of a data processing task. One of the drawbacks of traditional capacity planning is that these estimates are made in the "laboratory" when designing a system for operation but do not account for aspects of the actual production environment, whereas the invention enables capacity planning to be more accurately performed by leveraging information available about the processing environment that exists when the system is put into operation.

SUMMARY OF THE INVENTION

The invention provides a product, method and system for improved computer system data processing capacity planning using dependency relationships from a configuration management database. Specifically, a computer data processing capacity planning system is disclosed that utilizes known workload planning information along with hardware and/or software configuration information from the actual operating environment to accurately estimate the production system capacity available for use in carrying out one or more processing task(s).

The invention discloses a computer system data processing capacity planning algorithm that utilizes traditional input(s) to a workload modeling program as well as "neighborhood information" from a configuration management database (CMDB) identifying parameters for any other software process(es) and/or configuration(s) running on available hardware (along with the planned task(s)) in formulating an estimate of the expected system data processing workload at any (or all) point(s) in time. The output of the capacity planning algorithm program is a specification of configuration parameters used for allocating performance of required software processing functions to assigned hardware.

In operation, the capacity planning program algorithm can notify system user(s) of configuration "change events" having a negative (or positive) impact on previously planned tasks (through diminishment or enhancement of system processing resources or services) as the CMDB is automatically or manually updated with changes to the system hardware and/or software configuration (arising within the framework of a "workflow controlled" processing environment) which allows a user to approve (or reject) a configuration change depending on its impact to system capacity.

It is therefore an object of the present invention to provide a product, method and system for improved computer system data processing capacity planning using dependency relationship information stored in a configuration management database (CMDB) to accurately estimate the production system capacity available for use in carrying out one or more processing tasks.

It is another object of the present invention to provide a computer system data processing capacity planning algorithm that utilizes known workload modeling program inputs as well as information from a configuration management database (CMDB) identifying parameters for any other software processes or configurations running on available hardware in addition to the planned tasks in formulating an estimate of the expected system data processing capacity at any point in time.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

FIG. 1 illustrates the components of a computer system data processing capacity planning program according to the invention.

DETAILED DESCRIPTION OF THE PREFERRED EMBODIMENTS

Many computer databases and other applications (such as DB2® or WebSphere®) are used for matching hardware and/or software capacity to the estimated processing workload. FIG. 1 illustrates a system for implementing a computer data processing capacity planning algorithm 100 to extend the scope of software and hardware "dependency" information 120 used in such traditional workload modeling capacity planning systems 10 relating to planned processing tasks, by including parameters 121 acquired from a configuration management database (CMDB) 20 relating to other (possibly independent) operating software (i.e., size of memory "buffer pools", number of active program process "threads", specification of connections to database "back-end" servers, etc.) to determine the system processing resources needed to meet all production requirements. The algorithm can also use other system "neighborhood information" 121 gathered from the CMDB 20 (such as reduced processing capacity arising from hardware and/or software failures or components not configured for use) in making this calculation.

The capacity planning program algorithm 100 preferably has the following input parameters 120: (1) estimated workload (in terms of amount and/or rate of data input and/or output) required to accomplish a planned processing task (preferably obtained using a program such as IBM Opera® capacity planner); (2) calculated system processing response times measured from known data input arrival rates (preferably under a variant of Littles Law); (3) known or measured hardware processing capacity (i.e., computer processor/CPU speed, memory size/speed, data storage disk throughput, etc.); (4) formulas (that can be based on performance research) for calculating the effect of varying processor speed and/or memory allocation on workload output; and (5) "neighborhood information" 121 consisting of other system software resource usage (either gathered directly and/or learned from application profiles and/or retrieved from performance measurements of the software configuration) stored in the CMDB 20.

Using these inputs, the capacity planning program algorithm performs an analysis by generating a "requirements table" 110 of system hardware and/or software processing resources needed to meet specified production performance levels, which is then used in a "constraints-based planning" approach of matching (or "fitting") the needed software applications to the hardware systems utilized in processing them based on the required (and available) system resource types and their capabilities (performed in a manner similar to solving a traditional "bin-packing" problem using multiple processing resources as inputs). In cases where a solution is intractable, restrictions are imposed involving resource prioritization (for example CPU allocation may be given more importance than memory allocation and/or data storage disk speed, etc.) to provide a "locally optimum" solution. Once the "planning stage" is complete, the algorithm performs a "placement/validation phase" to confirm that hardware and/or software allocation constraints imposed by the plan are met, which assures that adequate processing capacity exists and that system resources will be reliably available for performing the designated processing tasks.

The output of the capacity planning algorithm program is an assignment of software resources to processing hardware, along with configuration parameters used for allocating performance of the software processing functions to the assigned hardware. In the example of an HTTP server, the configuration set may include the amount of physical memory dedicated for cache space, or the amount of CPU processing time assigned to a particular logical partition (LPAR) or hypervisor slice hosting the database or server application. The algorithm can be instituted at the beginning (i.e., the "roll-out" phase of system deployment) or it can be invoked based on "event notification" from the CMDB of configuration changes (particularly in the case of software not included in the original plan). In the case of initial capacity planning, a "placement stage" can also be instituted to "bin-pack" system software components to fit new hardware resources that were not included in the previous plan.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A computer system, comprising:
    a configuration management database (CMDB), comprising one or more parameters relating to any software configuration running on available hardware that is managed by the CMDB and comprising neighborhood information that documents any managed system capacity reductions due to one of hardware and software failures and un-configured components of other systems with an operating environment of the CMDB, where the CMDB comprises a processor configured to output event notifications of configuration changes related to any of the software configurations running on the variable hardware that is managed by the CMDB and the neighborhood information;
    a deployed-system workload modeling program that operates, in response to directly receiving the event notifications of configuration changes from the CMDB, to use one or more inputs related to the configuration changes and the neighborhood information received from the CMDB to formulate an estimate of system data processing capacity for the software configuration running on the available hardware at a point in time during a deployment phase of at least one of the software configurations; and
    where output configuration parameters are specified for allocating performance of planned software processing task to assigned system hardware.

2. The computer system of claim 1 where the configuration management database is updated with changes to system hardware or software configuration to allow a user to approve or reject a configuration change depending on impact to system capacity.

3. The computer system of claim 1 where the deployed-system workload modeling program executes a capacity planning algorithm comprised of at least one of the following inputs:
    amount of processing required to accomplish a planned task;
    system processing response time measured from data input rate;
    system hardware processing capacity;
    formulas for calculating any effect of varying processor speed or memory allocation on workload output; and
    usage or performance measurements for one or more software configurations stored in the configuration management database.

4. The computer system of claim 3 where resource priority restrictions are imposed or system software is assigned to newly available hardware to provide optimum system data processing capacity.

5. The computer system of claim 1, where the output configuration parameters are specified within a requirements table that further comprises assignment of software resources used by software processing task to the assigned system hardware.

6. The computer system of claim 1, where a placement validation phase confirms that allocations constrains imposed by the output configuration parameters are met.

7. A method, comprising:
    programming a configuration management database (CMDB), comprising one or more parameters relating to any software configurations running on available hardware that is managed by the CMDB as part of or in addition to one or more planned process and comprising neighborhood information that documents any managed system capacity reductions due to one of hardware and software failures and un-configured components of other systems within an operating environment of the CMDB, where the CMDB is configured to output event notifications of configuration changes related to any of the software configurations running on the available hardware that is managed by the CMDB and the neighborhood information;

instructing a deployed-system workload modeling program that operates, in response to directly receiving the event notifications of configuration changes from the CMDB, to use one or more inputs related to the configuration changes and the neighborhood information received from the CMDB to formulate an estimate of system data processing capacity for the software configuration running on the available hardware at a point in time during a deployment phase of at least one of the software configurations; and where output configuration parameters are specified for allocating performance of planned software processing task to assigned system hardware.

8. The method of claim 7 wherein the configuration management database is updated with changes to system hardware or software configuration to allow a user to approve or reject a configuration change depending on impact to system capacity.

9. The method of claim 7 where the deployed-system workload modeling program executes a capacity planning algorithm comprised of at least one of the following inputs:

amount of processing required to accomplish a planned task;

system processing response time measured from data input rate;

system hardware processing capacity;

formulas for calculating any effect of varying processor speed or memory allocation on workload output; and usage or performance measurements for one or more software configurations stored in the configuration management database.

10. The method of claim 9 wherein resource priority restrictions are imposed or system software is assigned to newly available hardware to provide optimum system data processing capacity.

11. he method of claim 7 where the output configuration parameters are specified within a requirement table that further comprises assignment of software resources used by the software processing task to the assigned system hardware.

12. The method of claim 7 further comprising performing a placement validation that confirms that allocation constraints imposed by the output configuration parameters are met.

13. A computer product comprising a computer readable storage memory containing program instructions that when executed by a computer cause the computer to:

program a configuration management database (CMDB), comprising one or more parameters relating to any software configurations running on available hardware that is managed by the CMDB as part of or in addition to one or more planned process and comprising neighborhood information that documents any managed system capacity reductions due to one of hardware and software failures and un-configured components of other systems within an operating environment of the CMDB, where the CMDB is configured to output event notifications of configuration changes related to any of the software configurations running on the available hardware that is managed by the CMDB and the neighborhood information;

instruct a deployed-system workload modeling program that operates, in response to directly receiving the event notifications of configuration changes from the CMDB, to use one or more inputs related to the configuration changes and the neighborhood information received from the CMDB to formulate an estimate of system data processing capacity for the software configurations running on the available hardware during a deployment phase of at least one of the software configurations; and where output configuration parameters are specified for allocating performance of planned software processing task to assigned system hardware.

14. The computer product of claim 13 where the configuration management database is updated with changes to system hardware or software configuration to allow a user to approve or reject a configuration change depending on impact to system capacity.

15. The computer product of claim 13 where the deployed-system workload modeling program executes a capacity planning algorithm comprised of at least one of the following inputs:

amount of processing required to accomplish a planned task;

system processing response time measured from data input rate;

system hardware processing capacity;

formulas for calculating any effect of varying processor speed or memory allocation on workload output; and usage or performance measurements for one or more software configurations stored in the configuration management database.

16. The computer product of claim 15 wherein resource priority restrictions are imposed or system software is assigned to newly available hardware to provide optimum system data processing capacity.

17. The computer product of claim 13, where the output configuration parameters are specified within requirements table that further comprises assignment of software resources used by the software processing task to the assigned system hardware.

18. The computer product of claim 13, further comprising program instructions that when executed by the computer cause the computer to execute a placement validation phase that confirm that allocation constraints imposed by the output configuration parameters are met.

* * * * *